June 3, 1952  J. HIGGINSON  2,599,452
SEED MECHANISM FOR GRAIN DRILLS
Filed June 23, 1949
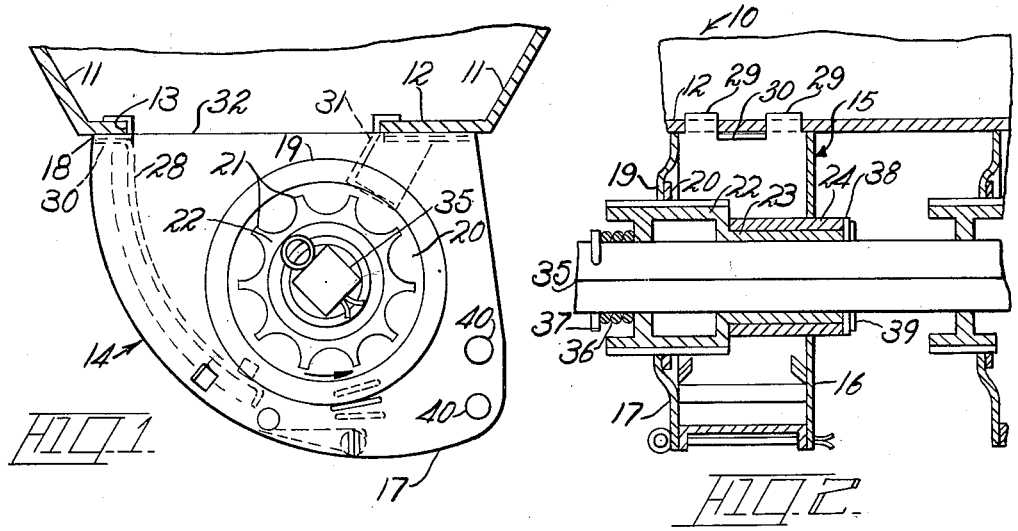
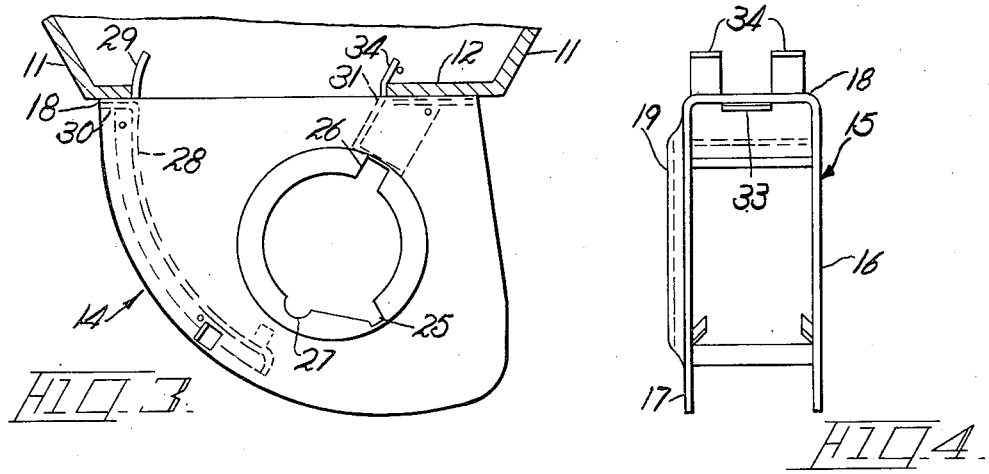
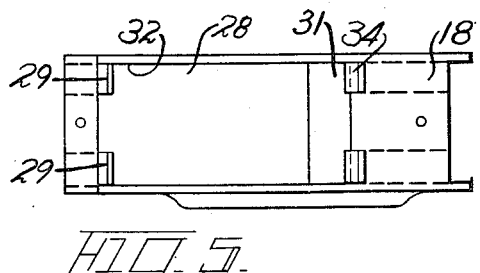
Inventor
John Higginson Patented June 3, 1952

2,599,452

UNITED STATES PATENT OFFICE 2,599,452

SEED MECHANISM FOR GRAIN DRILLS

John Higginson, Hamilton, Ontario, Canada, assignor to International Harvester Company of Canada, Limited, Hamilton, Ontario, Canada, a corporation of New Jersey Application June 23, 1949, Serial No. 100,919

4 Claims. (Cl. 222—274)

This invention relates to agricultural implements and particularly to grain drills. More specifically the invention relates to mechanism facilitating the assembly of grain drill feed cups to a grain hopper.

A grain drill generally comprises an elongated hopper adapted to carry grain or the like and supported upon wheels to extend transversely of the direction of travel and be propelled by a tractor or the like. The bottom of the grain drill hopper is provided with spaced openings therein adapted to register with a plurality of feed cups suspended from the hopper bottom. The grain is delivered through the hopper openings to the feed cups and discharged therefrom to furrow opening devices whereby the seed may be deposited in the soil. In a fluted feed grain discharging mechanism with which this invention is particularly concerned, a fluted or grooved wheel is carried in the grain discharging mechanism below the hopper for dispensing the seed, and each of the rollers is driven by a common drive shaft which extends for at least a portion of the length of the grain drill and has a number of feed cups mounted thereupon.

The problem of attaching the grain discharging mechanism or feed cups to the under side of the hopper body has previously been a very tedious operation and a difficult one since each feed cup was attached to the hopper bottom by securing means such as bolts and nuts which required the attention of several workmen.

The principal object of the present invention is to provide an improved feed cup or grain discharging mechanism having means for quickly attaching the feed cup to the bottom of the grain drill hopper. The invention is particularly valuable in that the feed cups and the drive shaft upon which they are mounted are attached to the hopper bottom as a unit.

Another object of the invention is to provide improved mechanism and means for attaching grain discharging structures to a hopper utilized in agricultural operations.

Other objects and advantages of the invention will appear hereinafter from a consideration of the following detailed description when taken in conjunction with the accompanying drawings, wherein:

Fig. 1 is an end view showing a portion of a grain hopper in section, having attached thereto a grain discharging mechanism embodying the features of the present invention;

Fig. 2 is an elevation in section showing the arrangement of feed cups upon the drive shaft and attached to the grain box;

Fig. 3 is an end view partly in section similar to Fig. 1 and showing the lugs or tabs projecting into the grain box prior to bending at right angles to hold the seed discharging mechanism thereto;

Fig. 4 is a view showing the grain discharge mechanism housing and is a view similar to that shown in Fig. 2 with the drive shaft and fluted roller removed; and Fig. 5 is a plan view of the structure shown in Fig. 4.

With reference to the drawings, the numeral 10 designates an elongated grain box or hopper for a grain drill having side walls 11 and a bottom 12. A plurality of openings 13 are provided at spaced locations along the length of the box and each said opening is adapted to discharge the material from the grain box into a grain discharging mechanism indicated at 14. It is understood, of course, that a plurality of grain discharging mechanisms 14 are provided, one for each opening in the hopper bottom. For convenience however, since the grain discharging mechanisms are duplicates, a description of one will suffice for all.

The grain discharging mechanism comprises a casing 15 having spaced parallel walls 16 and 17 connected by one or more cross-braces 18. Wall 17 of the casing has an annular rib 19 formed on the outer face thereof to confine therebetween and the wall 17 for rotation therein a member 20 having grooves 21 around the inner periphery thereof. The grooves 21 define an opening in the wall 17 of the casing 15 to receive a fluted transversely extending roller 22 having grooves therein adapted to mate with the grooves 21 in the member 20.

As shown in Fig. 2 the roller 22 is provided with a step-down portion 23 of lesser diameter which extends through and projects from an opening in the wall 16 of the casing 15. Also mounted upon the portion 23 of the roller is a sleeve 24 having a plurality of projections 25, 26, and 27 extending radially therefrom for reception in mating notches formed in the wall 16 of the casing. This construction accommodates transverse movement of the sleeve 24 and the roller 22 within the casing while holding the sleeve 24 against rotation. These projections on the sleeve 24 serve a further purpose which will hereinafter become clear.

Extending between the walls 16 and 17 of the casing and forming another wall is a shell 28 which as indicated in Figs. 1 and 3 is arcuate in shape, has an upper edge coincident with the upper edges of the walls 16 and 17 and a lower end which projects forwardly and downwardly to a location generally below the grooved roller 22. As shown in Figs. 1, 3, and 5, the upper end of the shell 28 has been cut to provide a pair of spaced lugs or tabs 29 and a central lug or tab 30. The casing and the shell are preferably formed of steel and the lug 30 is bent downwardly and under one of the cross pieces 18 of the casing and secured thereto preferably by a spot-weld. Lugs 29 extend upwardly from the casing 15 as indicated. Opposite the shell 28, as shown in Figs. 1 and 3, there is provided a shut-off block in the form of a metal strip 31 extending between the side walls 16 and 17 of the casing and extending to a location adjacent the upper portion of the grooved roller 22. The side walls 16 and 17 of the casing and the shell 28 and shut-off block 31 define an opening 32 in the grain discharging mechanism adapted to register with the opening 13 in the grain hopper bottom.

Shut-off block 31 is provided at its upper end with lugs similar to lugs 29 and 30 on the shell 28. Lug 33, for example, is bent downwardly and secured to one of the cross-pieces 18, and lugs 34 extend upwardly from the casing. As shown clearly in Fig. 3, lugs 34 are bent somewhat toward one wall 17 of the grain box and lugs 29 are very slightly bent in the same direction. These lugs extend upwardly through the opening in the bottom of the grain box and engage the marginal edges of the opening. In assembling the grain discharging mechanism to the hopper bottom, the bend provided in lug 34 does not interfere with the insertion of lugs in the opening in the grain box and provides a certain amount of support therefor. Upon insertion of the lugs 29 and 34 in the opening in the grain box, they are bent at right angles as shown in Fig. 1 simply by tapping with a hammer or the like.

Shut-off block 31 is angled slightly and shell 28 is made arcuate so that when grain falls into the opening in the discharge mechanism it is guided to the fluted roller 22. The roller is revolved in a direction indicated by arrows in Fig. 1, and the seed is discharged thereby beyond the lower end of the shell 28. Shut-off block 31 prevents seed from passing between the block and the roller 22.

The mounting of a plurality of grain discharging mechanisms upon a common drive shaft 35 is indicated in Fig. 2. The drive shaft 35 extends through an opening provided in the roller 22, and the roller is held in fixed position thereon by the provision at one end of a spring 36 held in place by a cotter key 37 passed through the shaft. At the reduced end 23 of the roller projecting from the casing wall 16 is mounted a washer 38 which is held in place by a cotter key 39 passed through the shaft 35.

The operation of the grain discharging mechanism to vary the flow of seed from the hopper is conventional. It may be noted, however, that the shaft 35 may be shifted longitudinally of the box so that the roller 22 may be shifted within the casing 15. In the position of the fluted roller shown in Fig. 2 a portion of the grooved section of the roller projects beyond the feed cup housing and only a portion of the roller is utilized in discharging grain. The projection 26 provided on the sleeve 24 is adjacent the shut-off block 31 and prevents passage of seed therethrough. Projection 25 on sleeve 24 terminates adjacent the discharge point of the seed from the inlet and reduces the flow of seed. To increase the amount of seed discharged from the feed cup, the shaft 35 and therefore the fluted roller would be shifted to the right so that more of the grooves in roller 22 would come into operation in discharging seed. Openings 40 are provided in the walls 16 and 17 of the casing for the attachment of suitable flexible hose (not shown) by which grain is directed to conventional furrow openers.

It should readily be understood from the foregoing description that the present invention provides means for quickly and easily attaching grain discharging mechanisms to a grain box. It may likewise be understood that modifications may be made in the invention without departing from the spirit thereof or the scope of the appended claims.

What is claimed is:

1. In a grain drill or the like including an elongated grain hopper having spaced openings in the bottom thereof for dispensing seed, a drive shaft parallel to and below the hopper and grain discharging mechanisms, one for each opening in the hopper bottom mounted on the shaft to be simultaneously driven thereby, wherein each said mechanism comprises a casing having spaced parallel side walls, a grooved roller journaled in said casing and mounted on said shaft for rotation therewith, an arcuately formed seed-carrying shell between the walls of the casing with its lower edge terminating adjacent the lower portion of the grooved roller, a shut-off block between the casing walls opposite said shell having its lower portion above and extending to a location adjacent said roller, and means for quickly attaching the discharging mechanisms and the drive shaft to the hopper bottom comprising lugs formed on the shell and the shut-off block extending upwardly therefrom, said lugs being bent at right angles to engage the hopper bottom at the marginal edges of the hopper opening in clamping relation, with at least one lug on the shell and one lug on the shut-off block engaging the outer surface of said hopper bottom, and the remainder of the lugs engaging the inner surface of said hopper bottom, said lugs engaging the outer surface of the hopper bottom being pre-bent, said lugs engaging the inner surface of said hopper bottom being of such material that they can be projected upward into said hopper bottom opening and then bent to engage said inner surface of the hopper bottom.

2. In a grain drill or the like including an elongated grain hopper having spaced openings in the bottom thereof for dispensing seed, a drive shaft parallel to the hopper and grain discharging mechanisms, one for cooperation with each opening in the hopper bottom and mounted on the shaft to be simultaneously driven thereby, wherein each said mechanism comprises a casing, a feed roller journaled in the casing and mounted on said shaft for rotation therewith, said casing having an opening therein adapted to register with an opening in the hopper bottom to direct seed to said feed roller, and means for facilitating the attachment to the hopper of the discharging mechanisms carrying the common drive shaft comprising lugs at opposite sides of the opening in the casing and extending upwardly therefrom, said lugs projecting into the hopper opening and engageable with the marginal edges of the opening in the hopper bottom, at least one of the lugs being pre-bent at an acute angle to provide support for the discharging mechanism upon insertion of the lugs in the hopper bottom, and the remainder of said lugs being of such material that they can be bent over at right angles into engagement with the inner surface of the hopper bottom to secure the discharging mechanism thereto.

3. In a grain drill or the like including an elongated grain hopper having spaced openings in the bottom thereof for dispensing seed, a drive shaft parallel to and below the hopper and grain discharging mechanisms, one for each opening in the hopper bottom mounted on the shaft to be simultaneously driven thereby, wherein each said mechanism comprises a casing having spaced parallel side walls, a grooved roller journaled in said casing and mounted on said shaft for rotation therewith, an arcuately formed seed-carrying shell between the walls of the casing with its lower edge terminating adjacent the lower portion of the grooved roller, and a shut-off block between the casing walls opposite said shell having its lower portion above and extending to a location adjacent said roller, at least two lugs formed on the shell and two lugs on the shut-off block, one of the respective lugs being bent at right angles and serving to secure the shell and the block to the casing and the other lugs projecting above the opening in the discharging mechanism for insertion in the opening in the hopper bottom, said other lugs being of such material that they can be bent at right angles into engagement with the hopper inner surface of the bottom to secure the discharging mechanism thereto.

4. In a grain drill or the like including an elongated grain hopper having spaced openings in the bottom thereof for dispensing seed, a drive shaft parallel to and below the hopper and grain discharging mechanisms, one for each opening in the hopper bottom mounted on the shaft to be simultaneously driven thereby, wherein each said mechanism comprises a casing having spaced parallel side walls, a grooved roller journalled in said casing and mounted on said shaft for rotation therewith, an arcuately formed seed-carrying shell between the walls of the casing with its lower edge terminating adjacent the lower portion of the grooved roller, and a shut-off block between the casing walls opposite said shell having its lower portion above and extending to a location adjacent said roller, at least two lugs formed on the shell and two lugs on the shut-off block, one of the respective lugs being bent at right angles and serving to secure the shell and the block to the casing and the other lugs projecting above the opening in the discharging mechanism for insertion in the opening in the hopper bottom, said other lugs being of such material that they can be bent at right angles into engagement with the inner surface of the hopper bottom to secure the discharging mechanism thereto, and the lugs on one side of said opening being pre-bent at an acute angle to provide support for the discharging mechanism upon insertion of the lugs in the hopper opening.

JOHN HIGGINSON.

REFERENCES CITED

The following references are of record in the file of this patent:

UNITED STATES PATENTS

| Number | Name | Date |
|--------|------|------|
| 823,242 | Waterman | June 12, 1906 |
| 895,346 | Dacosta | Aug. 4, 1908 |
| 924,327 | Pierce | June 8, 1909 |
| 1,864,294 | Cady et al. | June 21, 1932 |
| 1,997,791 | Hoverg et al. | Apr. 16, 1935 |